(12) United States Patent
Onno et al.

(10) Patent No.: US 8,489,892 B2
(45) Date of Patent: Jul. 16, 2013

(54) DEVICE AND METHOD FOR DIGITAL PROCESSING MANAGEMENT OF CONTENT SO AS TO ENABLE AN IMPOSED WORK FLOW

(75) Inventors: Stephane Onno, Saint Gregoire (FR); Olivier Heen, Domloup (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/450,351

(22) PCT Filed: Mar. 17, 2008

(86) PCT No.: PCT/EP2008/053181
§ 371 (c)(1),
(2), (4) Date: Sep. 22, 2009

(87) PCT Pub. No.: WO2008/116779
PCT Pub. Date: Oct. 2, 2008

(65) Prior Publication Data
US 2010/0070756 A1    Mar. 18, 2010

(30) Foreign Application Priority Data
Mar. 27, 2007   (EP) ..................................... 07300899

(51) Int. Cl.
*G06F 21/00*    (2006.01)

(52) U.S. Cl.
USPC ........... 713/189; 713/190; 713/191; 713/192; 713/193; 713/194; 726/1; 726/2; 726/3; 726/4; 726/5; 726/6; 726/7; 726/8; 726/9; 726/10; 726/11; 726/12; 726/13; 726/14; 726/15; 726/16; 726/17; 726/18; 726/19; 726/20; 726/21; 726/22; 726/23; 726/24; 726/25; 726/26; 726/27; 726/28; 726/29; 726/30; 726/31; 726/32; 726/33; 726/34; 726/35; 726/36

(58) Field of Classification Search
USPC .................. 713/189, 176, 17, 156, 179, 153, 713/190–194; 725/31; 380/210, 223, 231–231, 380/239, 259, 30; 726/1–36; 902/1–2; 709/247; 382/100
See application file for complete search history.

(56) References Cited

U.S. PATENT DOCUMENTS 5,796,839 A    8/1998   Ishiguro
5,915,025 A *  6/1999   Taguchi et al. ................. 380/44
(Continued)

FOREIGN PATENT DOCUMENTS
EP    0669741    8/1995
JP    7250059    9/1995
(Continued)

OTHER PUBLICATIONS

Vital, High-bandwidth Digital Content Protection System, Dec. 21, 2006.*

(Continued)

*Primary Examiner* — Andy Rao
*Assistant Examiner* — Shan Elahi
(74) *Attorney, Agent, or Firm* — Myers Wolin, LLC

(57) ABSTRACT

A device receives protected content and a license for the content, unprotects the content using an input key and retrieves a rule associated with the input key. The device then processes the content to create new content, retrieves at least one output key associated with the input key in the retrieved rule, protects the content using the output key and sends the newly protected content and the corresponding license. It is thus possible to impose a work flow as it is necessary for a device to store a particular key in order to access the content and as the rule imposes a particular output key depending on the input key. In a preferred embodiment, the content is scrambled using a symmetrical key that is encrypted by an asymmetrical key in the license. An alternate embodiment uses watermarking techniques instead of encryption. The invention finds particular use in video processing.

13 Claims, 4 Drawing Sheets

U.S. PATENT DOCUMENTS

| | | | | |
|---|---|---|---|---|
| 5,982,891 | A * | 11/1999 | Ginter et al. | 705/54 |
| 6,359,986 | B1 * | 3/2002 | Tatebayashi | 380/277 |
| 6,834,110 | B1 * | 12/2004 | Marconcini et al. | 380/239 |
| 6,834,346 | B1 * | 12/2004 | Ishibashi et al. | 713/179 |
| 7,336,799 | B2 * | 2/2008 | Matsumura et al. | 382/100 |
| 7,403,622 | B2 * | 7/2008 | Diehl et al. | 380/278 |
| 7,457,414 | B1 | 11/2008 | Kahn et al. | |
| 7,502,471 | B2 * | 3/2009 | Malvar et al. | 380/223 |
| 2003/0115450 | A1 * | 6/2003 | Smith | 713/153 |
| 2003/0217264 | A1 * | 11/2003 | Martin et al. | 713/156 |
| 2004/0076789 | A1 * | 4/2004 | Ono et al. | 428/65.3 |
| 2004/0123312 | A1 * | 6/2004 | Kimura | 725/31 |
| 2005/0144468 | A1 * | 6/2005 | Northcutt et al. | 713/189 |
| 2006/0123246 | A1 * | 6/2006 | Vantalon et al. | 713/189 |
| 2006/0178997 | A1 * | 8/2006 | Schneck et al. | 705/50 |
| 2007/0098162 | A1 * | 5/2007 | Shin | 380/201 |
| 2007/0116294 | A1 * | 5/2007 | Rogoff et al. | 380/278 |

FOREIGN PATENT DOCUMENTS

| | | |
|---|---|---|
| JP | 10003256 | 1/1998 |
| JP | 2002111656 | 4/2002 |
| JP | 2002521893 | 7/2002 |
| JP | 2003115837 | 4/2003 |
| JP | 2005184222 | 7/2005 |
| JP | 2006253983 | 9/2006 |
| WO | WO005642 | 2/2000 |
| WO | WO005642 | 2/2000 |

OTHER PUBLICATIONS

Rosenblattt et al, Integrating Content Management with Digital Rights Management, May 14, 2003.*

Lin et al, Advances in Digital Video Content Protection, Jan. 2005.*

Song et al, Content Protection System Using Smart Card Interface for Digital CATV Network Based on the OpenCable Specification, Jun. 17, 2003.*

Mahar et al, Design and Charcterization of a Hardware Encryption Management Unit for Secure Computing Platforms, Jun. 2006.*

Jin et al, Image Watermarking Based HVS Characteristic of Waveleet Transform, Jun. 2006.*

Wu et al, A Robust-Fragile Watermarking Scheme for Image Authentication, Aug. 2008.*

Lancini et al, A Robust Video Watermarking Technique for Compression and Transcoding Processing, Nov. 7, 2002.*

Deguillaume et al, "Secure hybrid robust watermaking resistant against tampering and copy attack", May 2003.*

R.T. Marshak: "IBM's Flowmark Object-Oriented Workflow for Mission-Critical Applications" Workgroup Computing Report, vol. 17, No. 5, May 1, 1994, pp. 3-13, XP000568699.

J. Fridrich: "Hybrid Watermark for Tamper Detection in Digital Images" International Symposium on Signal Processing and Its Applications. Proceedings, vol. 1, 22 Aug. 1999, pp. 301-304, XP000937952.

F. Deguillaume et al: "Secure hybrid robust watermarking resistant against tampering and copy attach", Signal Processing, Amsterdam, NL, vol. 83, No. 10, Oct. 2003, pp. 2133-2170, XP004452923 Search Report Dated Jun. 16, 2008.

Okamoto, E., "Cryptographic Technologies for Realizing Bright Informatizated Society, vol. 5: Delivery and Management of Cryptographic Keys", Kyoritsu Shuppan Co. Ltd., vol. 23, No. 12, pp. 51-59, Nov. 1, 1991.

* cited by examiner

DEVICE AND METHOD FOR DIGITAL PROCESSING MANAGEMENT OF CONTENT SO AS TO ENABLE AN IMPOSED WORK FLOW

This application claims the benefit, under 35 U.S.C. §365 of International Application PCT/EP2008/053181, filed Mar. 17, 2008, which was published in accordance with PCT Article 21(2) on Oct. 2, 2008 in English and which claims the benefit of European patent application No. 07300899.7, filed on Mar. 27, 2007.

FIELD OF THE INVENTION

The invention is generally directed to digital content protection, and more specifically to protection of such content in a processing chain.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Content, such as multimedia content—e.g. films and music—documents, photos and so on often need to be processed before it is released for the enjoyment of the end user.

Films, for example, pass many processing steps from the actual recording to the release: de-rushing, mixing, addition of digital effects, dubbing, subtitling, and so on.

It will be readily appreciated that a content provider has two requirements for a processing (also called post-processing) system: 1) strict and traceable processing operations, and 2) easy transmission and duplication of the content. The person skilled in the art will appreciate that prior art systems satisfy one or the other requirement, but not both.

Analogue systems generally satisfy the first requirement. As content is stored on tapes or film reels, it is relatively easy to control the processing: a particular content remains with a certain department until the tape is sent to the next department. In addition, it is also possible to trace the tape in case of theft. On the other hand, transmission of the content is less straight-forward, as this requires sending the physical tape, which naturally is difficult, particularly if long distances are involved. It is also difficult to provide the content to more than one entity at once, as the content has to be physically duplicated. In addition, erasing and/or destroying content after use may also provide constraints on the users.

Digital systems provide easy transmission and duplication of content. However, it is much more difficult to control the processing of the content: if the content resides on a server, it is very difficult to control who has access to it and errors may often be made if one department erroneously believes that the previous department has finished processing the content.

FIG. 1 shows an exemplary processing system in which the invention may be used. The system 100 comprises a subtitling device 110, a colour management device 120, a dubbing device 140, a digital special effects device 150, a storage device 160, and an emission clearance device 130, all connected by a network 170.

In the system of FIG. 1, it may for example be required that content pass colour management 120 and digital effects 150 (in no particular order) before being sent to dubbing 140 and optionally further to subtitling 110, before passing through emission clearance 130. As every device has access to the storage 160, it is difficult to control that the workflow is respected.

This difficulty in digital systems is inherent in Digital Rights Management (DRM) Systems. DRM controls access to the content according to usage restrictions. The content is encrypted and a separate license is provided to the end user.

A DRM architecture comprises a content provider, a content distributor, a license issuer, and content users, and has the following characteristics: 1) they are built around the servers, 2) an end user is not allowed to create new content and licenses from the obtained content, and 3) the right to decrypt the content is global—the user either has it or he doesn't.

It will thus be appreciated that the prior art DRM solutions are not appropriate to fulfil the two requirements listed hereinbefore.

It can thus be appreciated that there is a need for a solution that enables a processing system in which digital content may be easily distributed and duplicated, while it also imposes strict processing operations, this solution being called Digital Processing Management (DPM).

The present invention provides such a solution.

SUMMARY OF THE INVENTION

In a first aspect, the invention is directed to a method of processing content. Protected content is received and unprotected using a decryption key from a set of stored decryption keys. The content is processed to obtain processed content that is protected using at least one encryption key from a set of stored encryption keys. Each decryption key is linked to at least one encryption key of the set of stored encryption keys and the at least one encryption key is selected by selection of the at least one encryption key linked to the decryption key used for decryption. The selected at least one encryption key is different from the decryption key used for decryption if symmetrical encryption is used, and the selected at least one encryption key does not belong to the same key pair if asymmetrical encryption is used.

In a preferred embodiment, the received protected content is scrambled by a scrambling key, which in turn is encrypted using an asymmetrical encryption algorithm. The content is unprotected by decrypting the encrypted scrambling key using the decryption key to obtain the scrambling key, and unscrambling the scrambled content using the scrambling key.

It is preferred that the step of protecting the processed content comprises generating a new scrambling key; scrambling the processed content using the new scrambling key; and encrypting the new scrambling key using the asymmetrical encryption algorithm with the at least one encryption key. It is advantageous that the encrypted scrambling keys are incorporated in licenses linked to the protected content, and further that a license further comprises comments.

It is also preferred that the decrypting the encrypted scrambling key comprises iteratively utilising a plurality of decryption keys until the encrypted scrambling key is successfully decrypted.

In a further preferred embodiment, the received protected content is protected by a robust watermark and the robustly watermarked content is watermarked by a fragile watermark. The protected content is unprotected by removing the fragile watermark, and removing the robust watermark.

The method is particularly suited for multimedia content.

In a second aspect, the invention is directed to a device for processing protected content. The device comprises means for unprotecting the protected content using a decryption key from a set of stored decryption keys; means for processing the content; means for protecting the content using at least one encryption key from a set of stored encryption keys; and means for storing a plurality of input keys and output keys. Each decryption key is linked to at least one encryption key of the set of stored encryption keys. The device also comprises means for selecting the at least one encryption key by selection of the at least one encryption key linked to the decryption key used for decryption. The selected at least one encryption key is different from the decryption key used for decryption if symmetrical encryption is used, and the selected at least one encryption key does not belong to the same key pair if asymmetrical encryption is used.

In a preferred embodiment, the received content is scrambled by a scrambling key, the scrambling key being encrypted using an asymmetrical encryption algorithm, and the means for unprotecting the protected content are adapted to decrypt the encrypted scrambling key using the decryption key to obtain the scrambling key; and unscramble the scrambled content using the scrambling key.

It is advantageous that the device further comprises means for generating a new scrambling key, and that the means for protecting the processed content are adapted to scramble the processed content using the new scrambling key; and encrypt the new scrambling key using the asymmetrical encryption algorithm with the at least one encryption key.

It is also advantageous that the means for unprotecting the encrypted scrambling key are adapted to iteratively utilise a plurality of decryption keys until the encrypted scrambling key is successfully decrypted.

In a further preferred embodiment, wherein the received content is protected by a robust watermark, and the robustly watermarked content is watermarked by a fragile watermark, the means for unprotecting the protected content are adapted to remove the fragile watermark, and remove the robust watermark.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
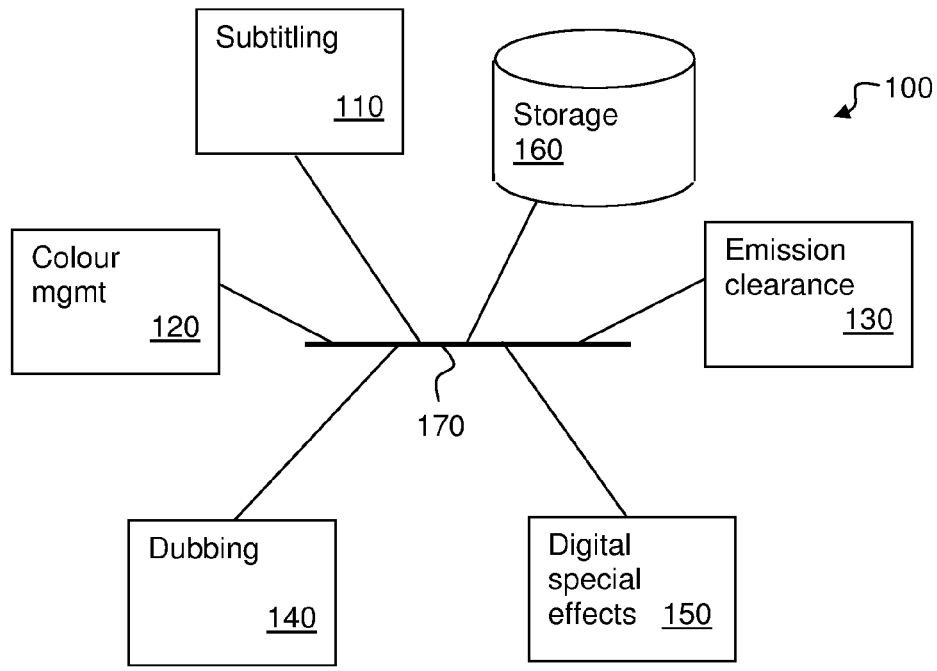
FIG. 1, already described, illustrates an exemplary processing system in which the invention may be used.
Figure 2:
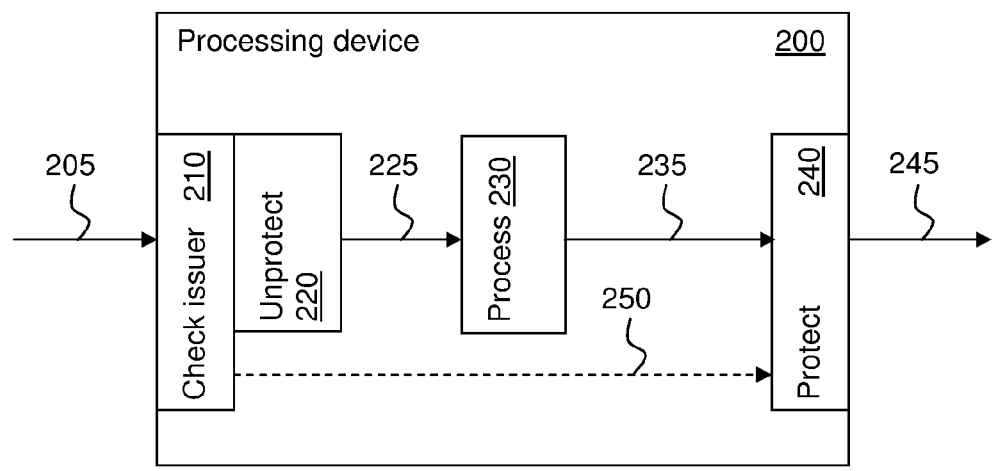
FIG. 2 illustrates the general inventive idea of the present invention.

FIG. 2 illustrates the general inventive idea of the present invention. Protected content 205 arrives at a processing device 200 that checks 210 who issued the content and, depending on the identity of the issuer or group of issuers in case more than one issuer may prepare the same kind of content, extracts a rule (further discussed hereinafter). The processing device 200 then unprotects 220 the content and uses the unprotected content 225 for processing 230, which often produces modified, unprotected content 235. The new content 235 is then protected 240 based on the extracted rule that enforces 250 a certain protection of the new content 235, which outputs new protected content 245. It should be noted, however, that processing need not necessarily modify the content; the content may remain the same, such as for example during emission clearance.

Preferred Embodiment

The preferred embodiment uses cryptography to control the process. Each device stores a number of input keys to decrypt incoming content and a number of output keys to re-encrypt outgoing content. The stored keys are normally a subset of all the keys used in the system.

Figure 3:
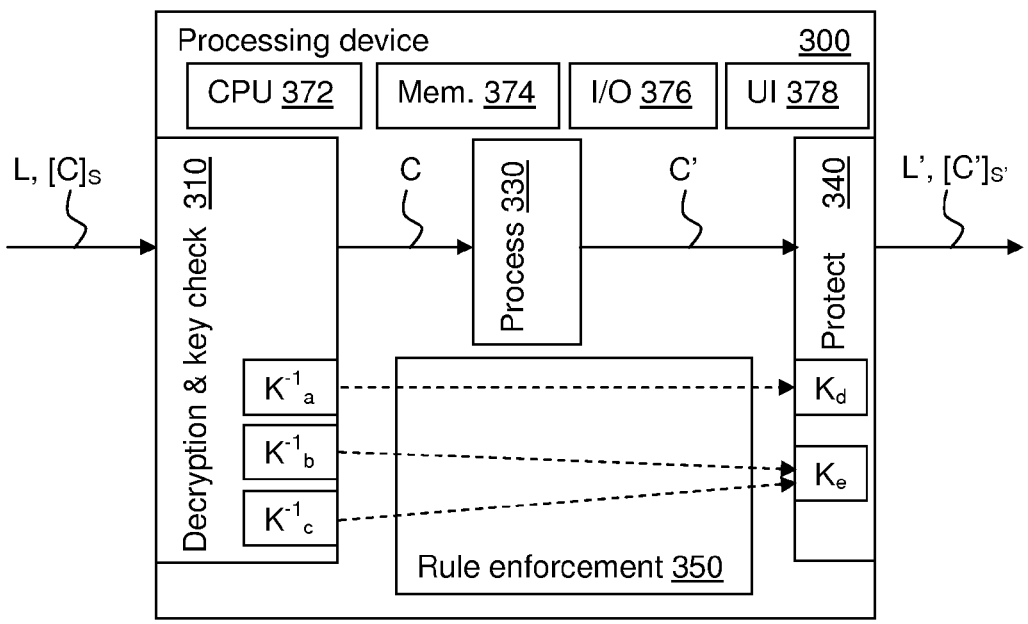
FIG. 3 illustrates a device according to a preferred embodiment of the invention.
Figure 4:
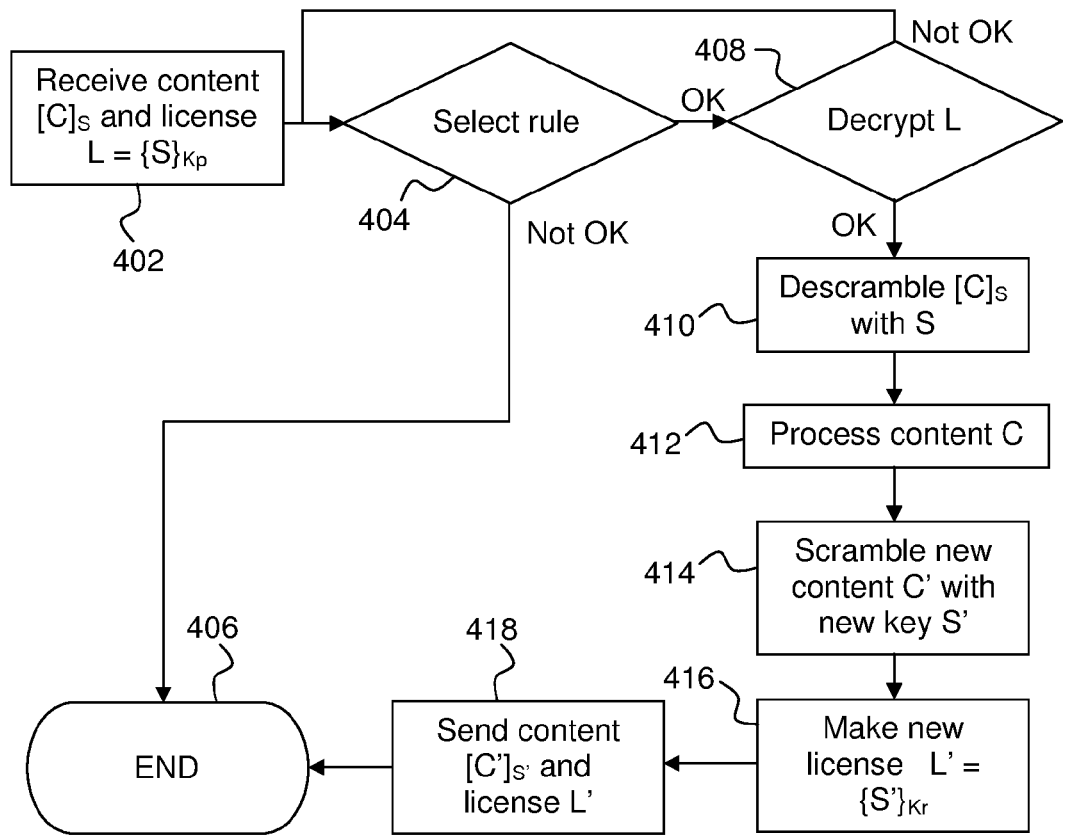
FIG. 4 illustrates a flow chart of a method according to a preferred embodiment of the invention.

FIG. 3 illustrates a device implementing the invention of the preferred embodiment, while FIG. 4 illustrates a method according to a preferred embodiment of the invention.

The processing device 300 comprises at least one processor 372, at least one memory 374, communication means 376 that may comprise separate input and output units, and a user interface 378. It is preferred that the at least one processor 372 performs the functions performed by the functional units described hereinafter. The skilled person will appreciate that the processing device 300 comprises further hardware and software units, such as for example at least one data bus, although these are beyond the scope of the invention and have not been indicated in the Figure for reasons of clarity of illustration.

Every content in the system is associated with a license, preferably in the same file as the content, but it is also possible that the content and the associated license are stored in two different files linked to each other. A license L may be written as $\{S, \text{comments}\}_{Ki}$, where S is a, preferably, symmetric key with which the content was scrambled, "comments" is digital information such as for instance time stamps and names input by one or more users, and $\{\ \}_{Ki}$ indicates the data within parenthesis is encrypted by an asymmetric encryption algorithm, such as RSA, using asymmetric key $K_i$. The comments may also comprise DRM rights, e.g. as expressed in a Right Expression Language (REL). It will be appreciated that the present invention enables the integrity of such data along the processing workflow.

Further, the decryption key that corresponds to an encryption key $K_i$ is denoted as $K^{-1}_i$.

A rule preferably comprises a type of processing device for which the rule is intended, an input decryption key $K^{-1}_i$ and a corresponding output encryption key $K_j$. The rule states that, for the processing device, content that was decrypted using the input key shall be encrypted using the output encryption key given by the rule. It should be noted that it is possible to use rules with one input decryption key that is linked to more than one output encryption key. This may for example be the case if content from a certain source shall be output in more than one copy, or if the operator of the processing device is to be given a choice of output encryption keys. Especially if the latter cases are used simultaneously in the system, it is advantageous to include an operator in the rule to inform the device if multiple outputs and/or operator choice is to be used.

The processing device 300 receives 402 data $L[C]_S$ comprising content $[C]_S$ scrambled (indicated by the square brackets) using scrambling key S, which preferably is symmetrical, and a license L comprising the scrambling key S and possibly one or more comments, the license being encrypted using an asymmetrical encryption algorithm with key $K_i$. It should be noted that the data may be sent to the processing device 300 as well as requested by it.

Upon reception of the data L[C]$_S$, a decryption and key check module 310 selects 404 a rule among the plurality of rules stored in a memory 372.

As is shown in the Figure, the processing device 300 comprises three rules, for which input decryption keys $K^{-1}_a$, $K^{-1}_b$, and $K^{-1}_c$ are indicated in the decryption and processing module 310, output encryption keys $K_d$ and $K_e$ are indicated in the protection module 340, and a rule enforcing module 350 verifies that the rules are enforced. In the example, the first rule R1 has $K^{-1}_a$ as input decryption key and $K_d$ as output encryption key, rule R2 has keys $K^{-1}_b$ and $K_e$, and rule R3 has keys $K^{-1}_c$ and $K_e$. It should be noted that R2 and R3 have different input decryption keys and the same output encryption key. The rules are preferably distributed in the system by a policy server (not shown) in order to make sure that one or more processing chains is created.

If no such rule is available or if all of the stored rules have already been tried ("Not OK"), then the method stops at step 406 "End". However, if the decryption and key check module 310 successfully selects a rule ("OK"), the method goes on in step 408 in which decryption of L with the decryption key $K^{-1}_i$ of the rule.

The decryption and key check module 310 may verify if the decryption was successful, for example by including a standard public value, such as "deadbeef" at a predetermined place in the license; if the value is found, then the license was successfully decrypted. In case the decryption was not successful ("Not OK"), then the method goes back to step 404 where another, preferably the next, rule is chosen.

On the other hand, if the decryption was successful ("OK"), then the decryption and key check module 310 extracts the scrambling key S and any comments therein and descrambles 410 the scrambled content [C]$_S$ using the scrambling key S.

Once the content C has been descrambled, it is forwarded to the processing module 330 for processing 412 and, possibly, addition of and/or suppression of comments. The processing module 330 then forwards the normally modified content C' to a protection module 340 that first scrambles 414 the modified content C' with a new scrambling key S' and then creates 416 a new license L' by encrypting the new scrambling key S' and any comments by the key imposed by the rule enforcement module according to the selected rule that successfully decrypted the license. The new data, comprising the license L' and the content [C']$_{S'}$, is then sent for example directly to a further device for further processing or to an external storage unit.

While the embodiment above describes the use of asymmetrical keys to protect the licenses, the person skilled in the art will appreciate that it is also possible to use symmetrical keys for this purpose, although such use reduces the security of the system somewhat.

Figure 5:
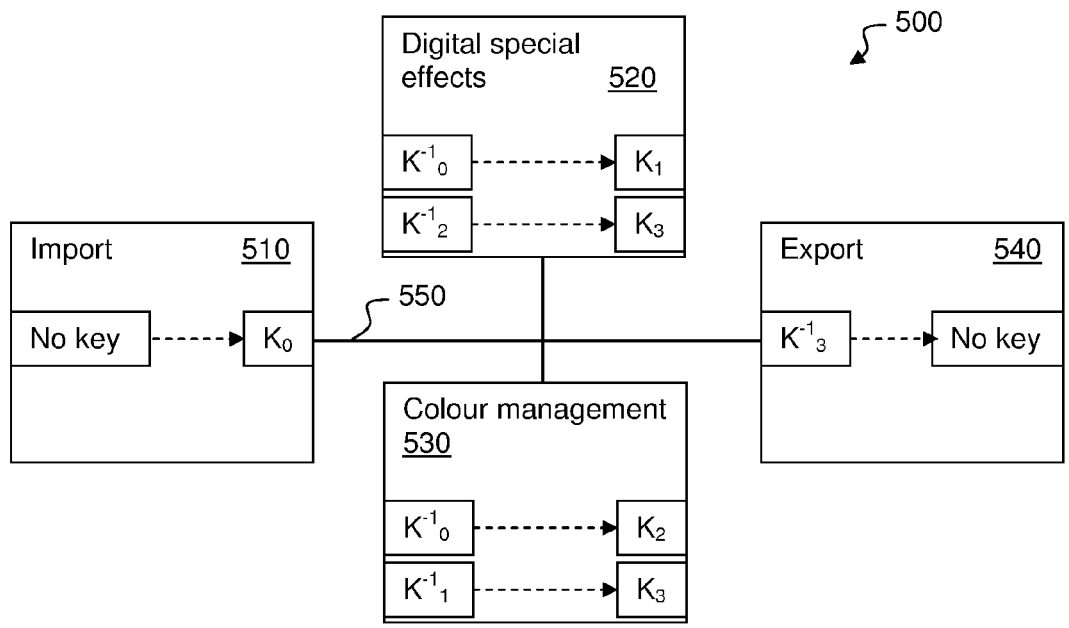
FIG. 5 illustrates the use of the invention in an exemplary processing system.

FIG. 5 illustrates the use of the invention in an exemplary network 500 comprising an import device 510, a digital special effects device 520, a colour management device 530, and an export device 540 connected by a local area network 550.

The import device 510 imports content that, in the present example, is unprotected—illustrated by "No key"— scrambles the content and creates a license using key $K_0$. The content may then be used by the digital special effects device 520 and the colour management device 530, but not the export device 540, as the latter does not have the requisite input decryption key.

The digital special effects device 520 may, using key $K^{-1}_0$, access content coming from the import device 510, in which case the content is output encrypted using key $K_1$ for use by the colour management device 530, but not by the export device 540. The digital special effects device 520 may also, using key $K^{-1}_2$, access content coming from the colour management device 530, in which case the content is output encrypted using key $K_3$ for use by the export device 540, but not by the colour management device 530.

Analogously, the colour management device 530 may, using key $K^{-1}_0$, access content coming from the import device 510, in which case the content is output encrypted using key $K_2$ for use by the digital special effects device 520, but not by the export device 540. The colour management device 530 may also, using key $K^{-1}_1$, access content coming from the digital special effects device 520, in which case the content is output encrypted using key $K_3$ for use by the export device 540, but not by the colour management device 530.

The export device 540 may, using key $K^{-1}_3$, use content coming from either the digital special effects device 520 or the colour management device 530, provided that the content was encrypted using key $K_3$. The export device 540 then exports the content, in the example unencrypted as is indicated by "No key" in the Figure.

It will thus be appreciated that the invention enforces the workflow in the exemplary system. Content that is introduced into the system by the import device 510 must pass through both the digital special effects device 520 and the colour management device 530, although the order is in the present case irrelevant, before the export device 540 can export the content.

While the preferred embodiment described video processing, it will be appreciated that the invention may also be applied to other environments in which it is important or desirable to impose strict work flows, such as in programming where the different files may be protected, for printed media where for example different articles and pictures may be protected, or for documents to which modifications should be made and/or digital signatures should be affixed in a certain order.

Figure 6:
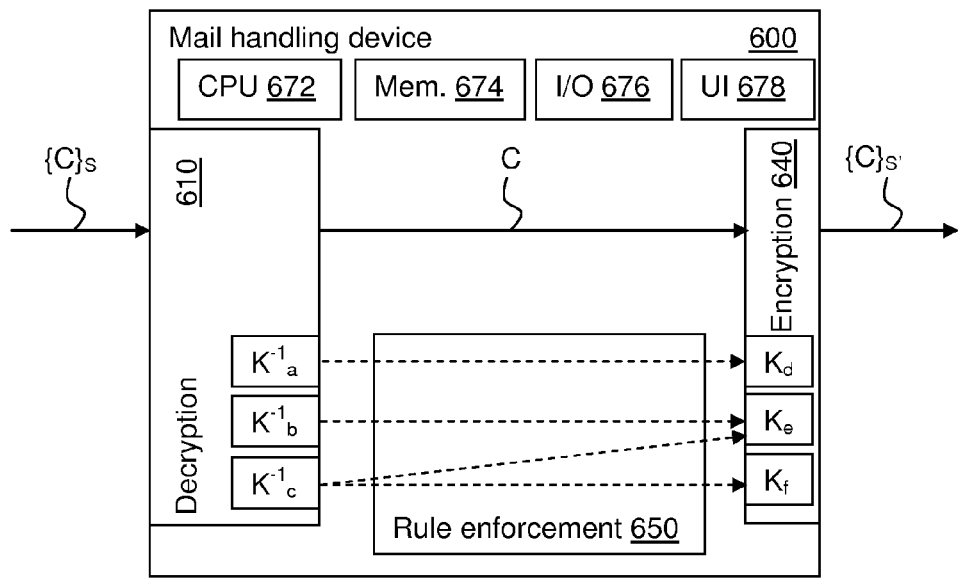
FIG. 6 illustrates an alternate use of the general inventive idea.

FIG. 6 illustrates an alternate use of the invention. A mail handling device 600 comprises at least one processor 672, at least one memory 674, communication means 676 that may comprise separate input and output units, and preferably a user interface 678.

The mail handling device 600 is adapted to perform a sort of "Out of Office" function, i.e. automatic transfer of incoming mails. While the exemplary embodiment is shown with encrypted incoming mails, it is to be understood that it may also be used with non-encrypted incoming mails (in which case an input decryption key may be said to be zero, i.e. the output of the decryption equals the input).

In the mail handler, the rules R stipulate that mail coming from a certain sender is to be decrypted using a certain input decryption key, encrypted using a certain output encryption key, and sent to the destination provided by the rule. It should be noted that it is possible to have one input message give rise to a plurality of encrypted output message, each output message being destined for a specific destination (illustrated in the Figure by having input key $K^{-1}_C$ linked to output keys $K_e$ and $K_f$.

It will thus be appreciated that the invention may also be used for secure automatic transfer of electronic mail.

Alternate Embodiment

Where the preferred embodiment employed cryptography, the alternate embodiment employs watermarks.

The embodiment uses a robust watermark for traceability and confidentiality, and a fragile watermark that ensures integrity together with the robust watermark. It should be noted that the invention may employ any state of the art robust and fragile watermarking algorithms.

In the alternate embodiment, constant messages are given in a processing system. For example, the robust watermark may use "dead" and the fragile watermark "beef". The robust watermark of content C using key K may thus be denoted $\{C, \text{dead}\}_K$. The fragile watermark is denoted $\{C, \text{beef}\}$. Licensed content L may be denoted $\{\{C, \text{dead}\}_K, \text{beef}\}$, i.e. the fragile watermark is inserted in the content already watermarked with the robust watermark, following well-known good practice.

Figure 7:
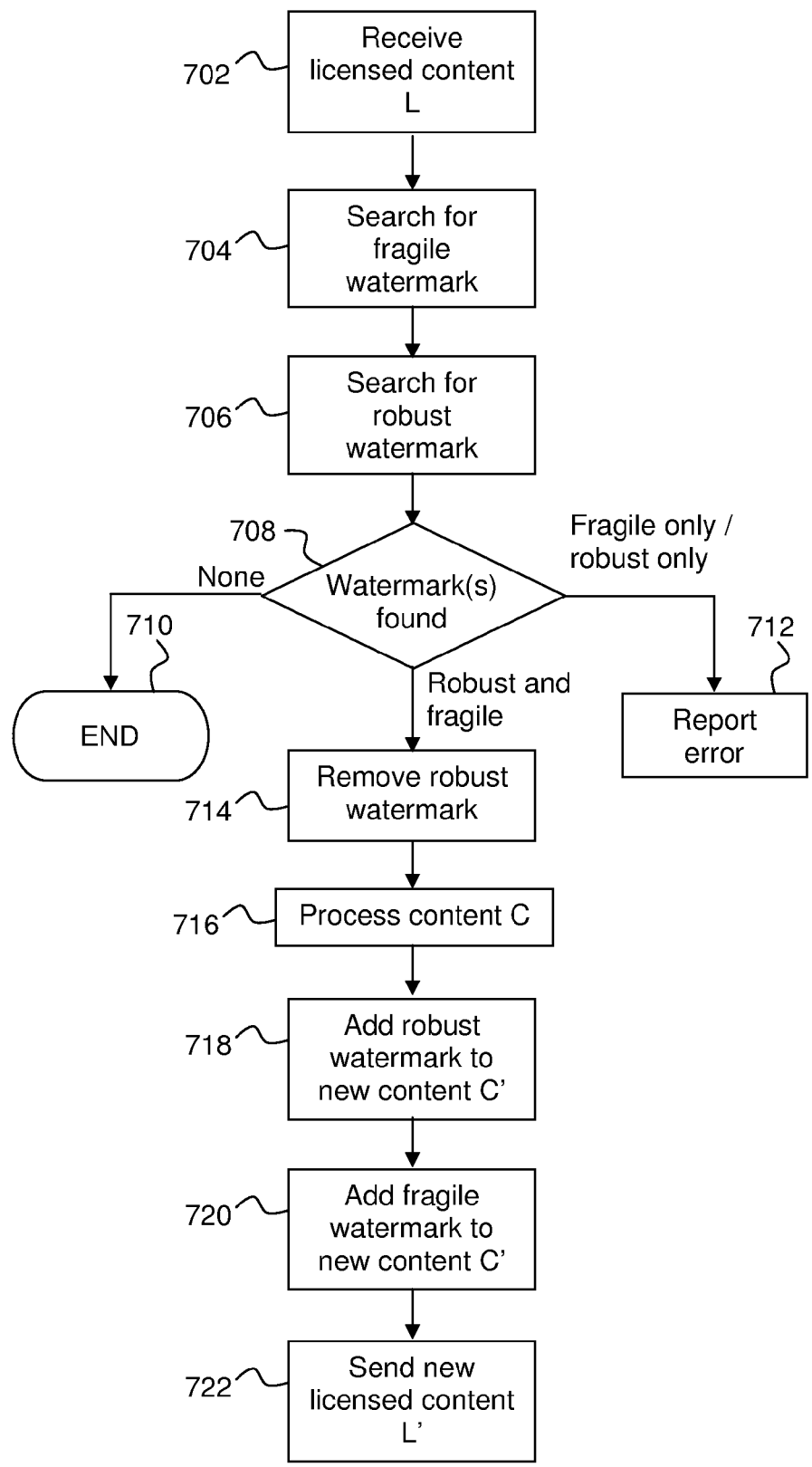
FIG. 7 illustrates a flow chart of an alternate embodiment of the invention.

FIG. 7 illustrates a flow chart illustrating content processing according to the alternate embodiment.

The processing device receives licensed content L in step 702. In step 704, the fragile watermark is searched for by verifying the equality $\{L\}$=beef. In step 706, the robust watermark is searched for iteratively using rules stored in the device, each rule comprising an input key $K_i$ and an output key $K_j$. This is done by verifying the equality $\{\{C, \text{dead}\}K_a\}K_i$=dead, where $K_a$ is the key used to insert the robust watermark and $K_i$ is the input key of the current rule.

In step 708, it is checked to see what watermark, if any, was found. If no watermark was found, the method ends in step 710. If one of the two watermarks was found, but not the other, then an error is reported in step 712. Finally, if both the robust watermark and the fragile watermark were found, then the method goes on to remove the robust watermark in step 714 to produce unprotected content C.

As the fragile watermark is designed to be destroyed as soon as the content is modified, there is no need to specifically remove this watermark.

Once the unprotected content C is obtained, it may be modified in step 716 to obtain new content C'. After processing, a new robust watermark is added to the new content C', using the output key that according to the rule corresponds to the correct input key. Then, in step 720, a fragile watermark is added to the robustly watermarked content so as to create new licensed content L' that is sent in step 722.

A person skilled in the art will appreciate that it is possible to combine embodiments of the invention, for example by using the cryptographic solution of the preferred embodiment in a digital environment, the watermark solution of the alternative embodiment, when the content "goes analogue", and then back again to the cryptographic solution when the content re-enters the, or another, digital environment.

The skilled person will also appreciate that it is possible to use both the cryptographic solution and the watermark solution at the same time and for the same content. This requires successful double verification of the protection in order to be able to access the content.

It will thus be appreciated that the method provides an alternate way of protecting content and imposing strict a work flow.

As will be appreciated, the present invention enables enforcement of strict workflows, for example for processing video content, and also protection of such content.

It will be understood that the present invention has been described purely by way of example. Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of processing content following an imposed workflow, the method comprising at a first device:
   receiving protected content;
   unprotecting the content using a decryption key from a set of stored decryption keys;
   processing the content to obtain processed content;
   protecting the processed content using at least one encryption key from a set of stored encryption keys; and
   outputting the processed content protected using the at least one encryption key;
   wherein each decryption key corresponds to at least one encryption key of the set of stored encryption keys by a rule that together with at least one other rule on a second device enforces the workflow for the content from the first device to the second device; and
   the method further comprising selecting the at least one encryption key that corresponds to the decryption key used for decryption;
   wherein the selected at least one encryption key is different from the decryption key used for decryption if symmetrical encryption is used, and the selected at least one encryption key does not belong to the same key pair if asymmetrical encryption is used.

2. The method as claimed in claim 1, wherein the received protected content is scrambled by a scrambling key, the scrambling key being encrypted using an asymmetrical encryption algorithm, wherein the unprotecting the content comprises:
   decrypting the encrypted scrambling key using the decryption key to obtain the scrambling key; and
   unscrambling the scrambled content using the scrambling key.

3. The method as claimed in claim 2, wherein the protecting the processed content comprises:
   generating a new scrambling key;
   scrambling the processed content using the new scrambling key; and
   encrypting the new scrambling key using the asymmetrical encryption algorithm with the at least one encryption key.

4. The method as claimed in claim 3, wherein the encrypted scrambling keys are incorporated in licenses linked to the protected content.

5. The method as claimed in claim 4, wherein a license further comprises comments.

6. The method as claimed in claim 2, wherein the decrypting the encrypted scrambling key comprises iteratively utilising a plurality of decryption keys until the encrypted scrambling key is successfully decrypted.

7. The method as claimed in claim 1, wherein the received protected content is protected by a robust watermark, and the robustly watermarked content is watermarked by a fragile watermark, wherein the unprotecting the protected content comprises:
   removing the fragile watermark, and
   removing the robust watermark.

8. The method of claim 1, wherein the content is multimedia content.

9. A device for processing protected content following an imposed workflow, the device comprising:
   at least one processor for:
      unprotecting the protected content using a decryption key from a set of stored decryption keys;
      processing the content;
      protecting the content using at least one encryption key from a set of stored encryption keys; and
      outputting the processed content protected using the at least one encryption key;
   memory for storing a plurality of input keys and output keys;
   wherein each decryption key corresponds to at least one encryption key of the set of stored encryption keys;
   the device further comprising a rule enforcing module for selecting the at least one encryption key by selection of the at least one encryption key corresponding to the decryption key used for decryption by a rule that together with at least one other rule on a second device enforces the workflow for the content; and
   wherein the selected at least one encryption key is different from the decryption key used for decryption if symmetrical encryption is used, and the selected at least one encryption key does not belong to the same key pair if asymmetrical encryption is used.

10. The device as claimed in claim 9, wherein the received content is scrambled by a scrambling key, the scrambling key being encrypted using an asymmetrical encryption algorithm, wherein the at least one processor for unprotecting the protected content is adapted to:
   decrypt the encrypted scrambling key using the decryption key to obtain the scrambling key; and
   unscramble the scrambled content using the scrambling key.

11. The device as claimed in claim 10, further comprising a protection module for generating a new scrambling key, and wherein the at least one processor for protecting the processed content is adapted to:
   scramble the processed content using the new scrambling key; and
   encrypt the new scrambling key using the asymmetrical encryption algorithm with the at least one the encryption key.

12. A system comprising at least a first and a second device for processing protected content following an imposed workflow, the first and the second device comprising:
   at least one processor for:
      unprotecting the protected content using a decryption key from a set of stored decryption keys;
      processing the content;
      protecting the content using at least one encryption key from a set of stored encryption keys; and
      outputting the processed content protected using the at least one encryption key;
   memory for storing a plurality of input keys and output keys;
   a rule enforcing module for selecting the at least one encryption key by selection of the at least one encryption key corresponding to the decryption key used for decryption by a rule so that the rule of the first device and the rule of the second device enforce the workflow for the content;
   each decryption key being corresponding to at least one encryption key of the set of stored encryption keys;
   wherein the selected at least one encryption key is different from the decryption key used for decryption if symmetrical encryption is used, and the selected at least one encryption key does not belong to the same key pair if asymmetrical encryption is used; and
   wherein at least one output key of the first device corresponds to an input key of the second device.

13. The system of claim 12, further comprising a policy server adapted to distribute rules in the system to create at least one processing chain of the workflow.

\* \* \* \* \*